(12) United States Patent
Saklang et al.

(10) Patent No.: US 12,716,796 B2
(45) Date of Patent: Aug. 25, 2026

(54) LOW STRESS PACKAGING FOR ENVIRONMENTAL SENSORS

(71) Applicant: NXP USA, Inc., Austin, TX (US)

(72) Inventors: Chayathorn Saklang, Mesa, AZ (US); Stephen Ryan Hooper, Queen Creek, AZ (US); Julien Juéry, Tempe, AZ (US)

(73) Assignee: NXP USA, Inc., Austin, TX (US)

( * ) Notice: Subject to any disclaimer, the term of this patent is extended or adjusted under 35 U.S.C. 154(b) by 428 days.

(21) Appl. No.: 18/464,497

(22) Filed: Sep. 11, 2023

(65) Prior Publication Data

US 2025/0085182 A1 Mar. 13, 2025

(51) Int. Cl.
*G01L 19/14* (2006.01)
*G01L 9/00* (2006.01)

(52) U.S. Cl.
CPC ............ *G01L 19/14* (2013.01); *G01L 9/0041* (2013.01)

(58) Field of Classification Search
None
See application file for complete search history.

(56) References Cited

U.S. PATENT DOCUMENTS 7,964,954 B2 * 6/2011 Schmitt ................. H10F 39/804 257/419
8,191,423 B2 * 6/2012 Chiou ................... G01L 9/0052 73/727
8,307,714 B1 11/2012 Hooper et al.
9,214,402 B2 12/2015 Fam et al.
9,945,747 B1 * 4/2018 Kusanale ............ G01L 19/0627
12,181,358 B2 * 12/2024 Wade .................. G01L 19/0645
2012/0168884 A1 * 7/2012 Yao ..................... G01L 19/0069 438/51
2012/0304777 A1 12/2012 Hooper et al.

FOREIGN PATENT DOCUMENTS

DE 102020212123 A1 * 12/2021 ......... G01L 19/0645
GB 2371674 A 7/2002

* cited by examiner

*Primary Examiner* — Peter J Macchiarolo
*Assistant Examiner* — Jermaine L Jenkins

(57) ABSTRACT

One or more sensor devices are encapsulated on a top surface of a carrier substrate within an elastomer material. The carrier substrate includes one or more recessed channels adjacent to each sensor device which are filled by a portion of the elastomer material to create flanged areas that are level with the top surface of the carrier substrate. A cover which can include a liquid or gas input port or other related structures can be placed over each sensor device and bonded to the carrier substrate at the flanged areas, creating a seal between the cover and the carrier substrate that surrounds each sensor device.

20 Claims, 3 Drawing Sheets

200
210
220
230
240
105
102
110
120
130
150
152
155
232

LOW STRESS PACKAGING FOR ENVIRONMENTAL SENSORS

TECHNICAL FIELD

Embodiments of the subject matter described herein relate to environmental sensors, electronic device packaging, and multi-chip integration.

BACKGROUND

Semiconductor devices and other electronic devices are frequently assembled into packages to protect the devices from damage and to provide macroscopic electrical contacts. Packages can be made of various materials including polymers and ceramics. Environmental sensors such as gas sensors and pressure sensors often require special packages that expose the sensing elements to the external environment while continuing to protect the sensing elements against damage or degradation. Some gas or pressure sensors are partially packaged in elastomer packages which can include gas ports or fluid hose connectors and other structures,

SUMMARY

In an example embodiment a method includes encapsulating a first sensor device on a top surface of carrier substrate within a volume of elastomer material, and bonding a cover to the carrier substrate that overlies the volume of elastomer material such that the cover is separated from the volume of elastomer material by a gap within a first region above the first sensor device. The first sensor device is adjacent to a first recessed channel in the carrier substrate. The volume of elastomer material has a first height above the carrier substrate in the first region above the first sensor device. A portion of the volume of elastomer material fills the first recessed channel and forms a first flanged area that is recessed below the first height in a second region adjacent to the first region.

In another example embodiment a device includes a first sensor device disposed on a top surface of a carrier substrate adjacent to a first recessed channel in the carrier substrate; a volume of elastomer material disposed on the carrier substrate that encapsulates the first sensor device; and a cover disposed above the volume of elastomer material.

The volume of elastomer material has a first height above the carrier substrate in a first region above the first sensor device. A portion of the volume of elastomer material fills the first recessed channel to form a first flanged area that is recessed below the first height in a second region adjacent to the first region. The cover is bonded to the first flanged area in the second region that overlies the volume of elastomer material such that the cover is separated from the volume of elastomer material by a gap within the first region.

BRIEF DESCRIPTION OF THE DRAWINGS

The present disclosure is illustrated by way of examples, embodiments and the like and is not limited by the accompanying figures, in which like reference numbers indicate similar elements. Elements in the figures are illustrated for simplicity and clarity and have not necessarily been drawn to scale. The figures along with the detailed description are incorporated and form part of the specification and serve to further illustrate examples, embodiments and the like, and explain various principles and advantages, in accordance with the present disclosure, wherein.

DETAILED DESCRIPTION

Figure 1:
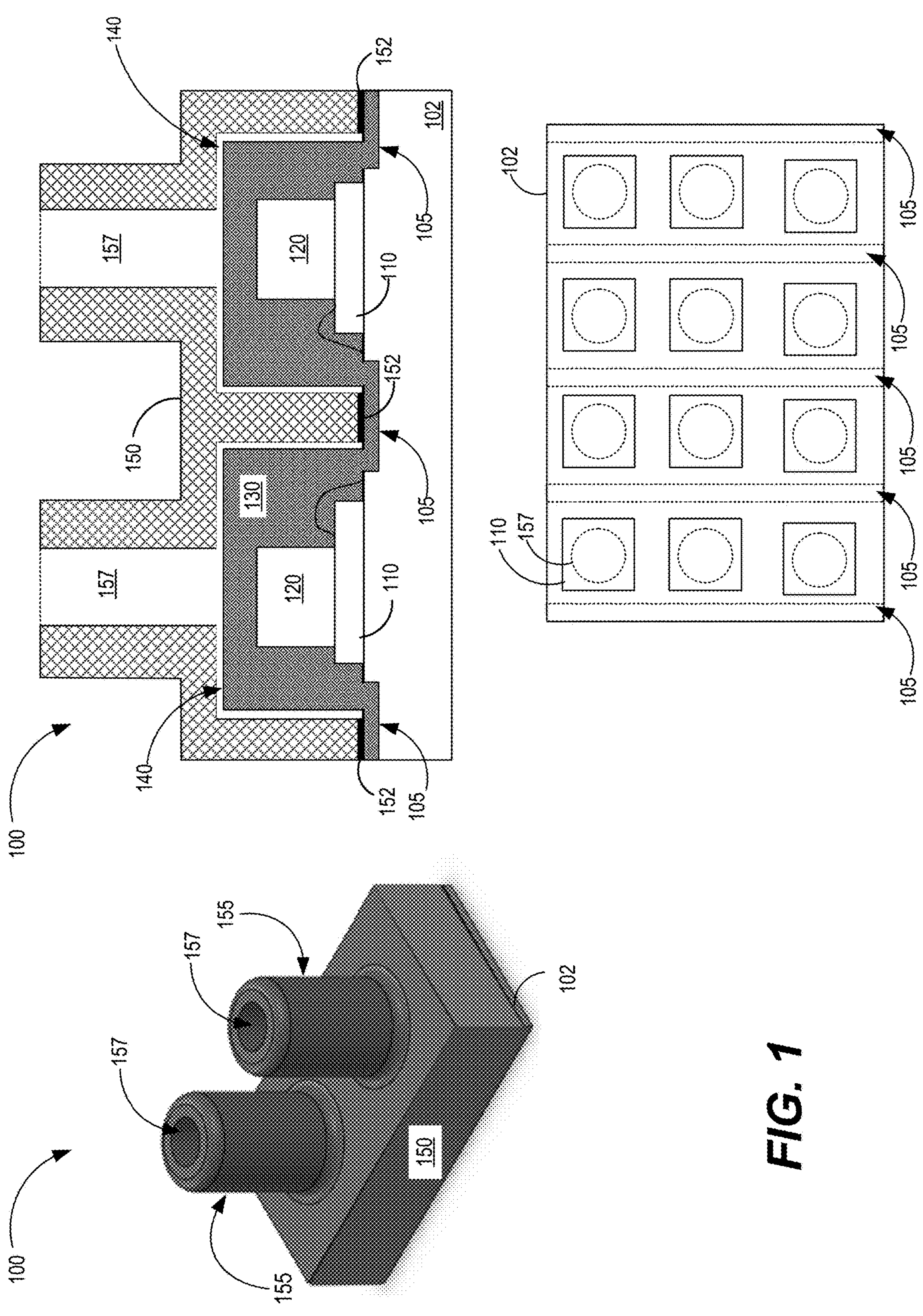
FIG. 1 shows a perspective view, plan view, and a cross-sectional elevation view of dual pressure sensor device packaged according to one or more embodiments.

The following detailed description provides examples for the purposes of understanding and is not intended to limit the invention or the application and uses of the same. Furthermore, there is no intention to be bound by any expressed or implied theory presented in the preceding technical field, background, or the following detailed description.

For simplicity and clarity of illustration, the drawing figures illustrate the general manner of construction, and descriptions and details of well-known features and techniques may be omitted to avoid unnecessarily obscuring the invention. Additionally, elements in the drawing figures are not necessarily drawn to scale. For example, the dimensions of some of the elements or regions in the figures may be exaggerated relative to other elements or regions to help improve understanding of embodiments of the invention.

The terms "first," "second," "third," "fourth" and the like in the description and the claims, if any, may be used for distinguishing between similar elements and not necessarily for describing a particular sequential or chronological order. It is to be understood that the terms so used are interchangeable under appropriate circumstances such that the embodiments of the invention described herein are, for example, capable of operation in sequences other than those illustrated or otherwise described herein. Furthermore, the terms "comprise," "include," "have" and any variations thereof, are intended to cover non-exclusive inclusions, such that a process, method, article, or apparatus that comprises a list of elements is not necessarily limited to those elements but may include other elements not expressly listed or inherent to such process, method, article, or apparatus. The term "coupled," as used herein, is defined as directly or indirectly connected in an electrical or non-electrical manner. As used herein the terms "substantial" and "substantially" mean sufficient to accomplish the stated purpose in a practical manner and that minor imperfections, if any, are not significant for the stated purpose.

Directional references such as "top," "bottom," "left," "right," "above," "below," and so forth, unless otherwise stated, are not intended to require any preferred orientation and are made with reference to the orientation of the corresponding figure or figures for purposes of illustration.

It will be appreciated that the steps of various processes described herein are nonlimiting examples of suitable processes according to embodiments and are for the purposes of illustration. Systems and devices according to embodiments herein may be use any suitable processes including those that omit steps described above, perform those steps and similar steps in different orders, and the like. It will also be appreciated that well-known features may be omitted for clarity.

Devices and methods described herein enable assembly of sensor devices encapsulated by an elastomer material on semiconductor substrates, printed circuit boards and other substrates followed by placement of rigid or semi-rigid covers over those devices which can include external connections for liquid or gas hoses and similar structures. Features of various embodiments allow for assembly of numerous devices (e.g., using panel-level processing technologies) followed by dicing into smaller units without compromising encapsulation of the sensor devices or sealing of the covers to the resulting diced substrates.

FIG. 1 shows an example device according to one or more embodiments. The device 100 is formed on a carrier substrate 102 (e.g., a printed circuit board) and includes two sensor devices 120. In the example of FIG. 1, the sensor devices 120 are formed on and/or electrically and mechanically coupled to respective die 110. The sensor devices 120 can be electrically coupled to the carrier substrate 102 by one or more electrical interconnects (represented by a wirebond in FIG. 1 from a die 110 to the carrier substrate 102). The sensor devices 120 are disposed within a cover 150 that includes a port 155 with an aperture 157 disposed above each sensor device 120. The sensor devices 120 are encapsulated within a volume of elastomer material 130 which is separated from the inner surfaces of the cover 150 by an air gap 140. In one or more embodiments, a cover such as the cover 150 has an elastic modulus that is greater than an elastic modulus of the elastomer material 130 If one or more of the sensor devices 120 are pressure sensors, the elastomer material 130 may be configured with an elastic modulus that allows it to deform when pressure applied to it from the ambient environment through an aperture 157 in a corresponding port 155, thereby transmitting that applied pressure to the corresponding sensor device 120. The applied pressure can be converted to an electrical signal using any suitable structure(s) including, as nonlimiting examples, piezoelectric elements, piezoresistive elements, magnetoresistive elements, combinations thereof, and the like.

As shown in FIG. 1, the carrier substrate 102 includes recessed channels 105 adjacent to each sensor device 120. During assembly of devices such as the device 100, the elastomer material 130 can be dispensed and molded such that elastomer material 130 fills the recessed channels 105, as shown to create flanges or portions of one or more continuous flanges around the sensor devices 120. For convenience both individual flanges or portions of a flange may be described herein as a "flanged area."

The cover 150 is dimensioned to surround the sensor devices 120 and to be bonded to the flanges in the recessed channels 105 (e.g., using an adhesive material 152 as shown in FIG. 1) without contacting the rest of the elastomer material 130 surrounding the sensor devices 120 due to the air gap 140 between the cover 150 and the elastomer material 130 immediately surrounding the sensor devices 120. The presence of a recessed channel 105 in between the two sensor devices 120 shown allows them to be mechanically isolated from each other and from the cover 150. As a result, the device 100 shown can be used as differential pressure sensor in which each sensor device 120 measures a different pressure based on the ambient environment created within each aperture 157 (e.g., by connecting separate gas or liquid hoses to each port 155 of the cover 150).

As can be understood from the plan view of FIG. 1, multiple devices such as the device 100 can be formed on a single carrier substrate 102. As shown, the recessed channels 105 can extend along the entire length of the carrier substrate 102 which can facilitate high-volume manufacturing processes in which the elastomer material 130 can be molded or otherwise dispensed across an entire carrier substrate at once. As a result, each sensor device 120 can be fully encapsulated and isolated from each other device. Because the volume of elastomer material 130 encapsulates the sensor devices 120 and also fills the recessed channels 105, the carrier substrate 102 can be diced using known equipment without damaging the sensor devices 120 or requiring special handling (e.g., dicing in a cleanroom environment). In addition, filling of the recessed channels 105 with the elastomer material 130 forms flanged areas around each sensor device 120. The flanged areas formed by the elastomer material 130 provides a level surface for subsequent bonding of the cover 150 and can enable an air-tight seal between the cover 150 and the flanged areas (i.e., the elastomer material 130 within the recessed channels 105).

The elastomer material 130 may be any suitable material including silicone-based materials and may be formed using any suitable methods. For example, a polymer precursor material can be dispensed through a molding fixture and subsequently cured using heat or ultraviolet light. The elastomer material 130 may be chosen for its ability to maintain its overall shape while still deforming sufficiently to transmit pressure changes to the sensor devices 120 over a design range of ambient pressures. The elasticity of the elastomer material 130 may also be modified to achieve a desired modulus by the addition of filler materials such as glass or silica particles, carbon particles, and the like, as nonlimiting examples. The cover 150 may be made from any suitable material, including well-known molding compounds. Generally, it is desirable that the elastic modulus of the cover 150 is greater than the elastic modulus of the elastomer material 130 (i.e., that the cover 150 is relatively rigid compared to the elastomer material 130.)

As an example, in one or more embodiments, an elastomer material such as the elastomer material 130 has an elastic modulus in a range from 0.2-15 MPa, while a cover such as the cover 150 has an elastic modulus of at least 15-20 GPa) In one or more embodiments, the elastic modulus of the cover is at least 1000 times greater than the elastic modulus of the elastomer material.

Figure 2:
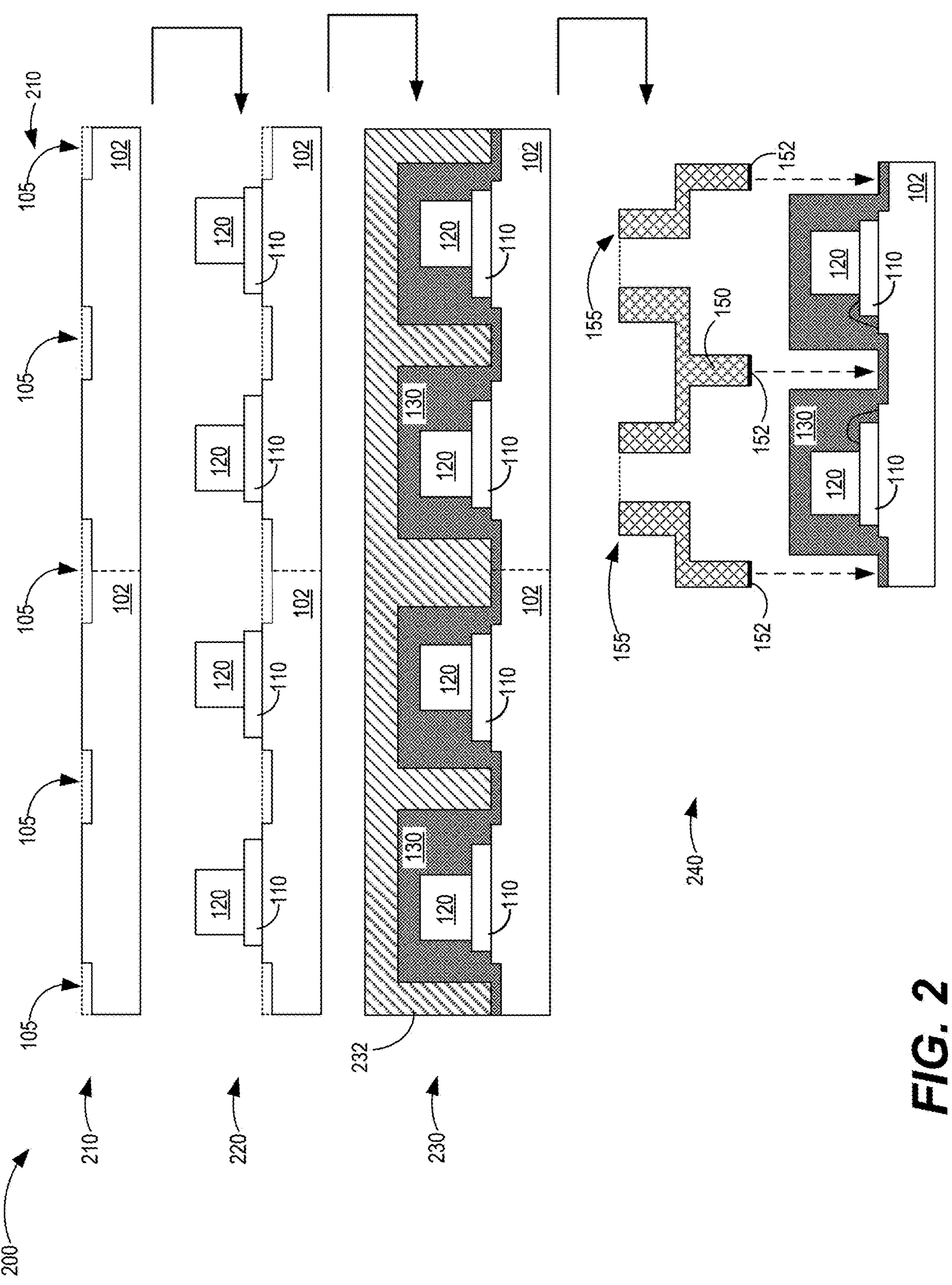
FIG. 2 shows cross-sectional views of the device of FIG. 1 during steps in a process suitable for forming the device of FIG. 1 and similar devices according to one or more embodiments.

FIG. 2 depicts steps in an example process suitable for forming the device 100 of FIG. 1 and similar devices. The process 200 includes the steps 210, 220, 230, and 240 which are described below with reference to components of the device 100. It will be appreciated that, in one or more embodiments, steps of the process 200 or similar steps may be omitted or performed in any suitable order other than order described herein in connection with FIG. 2.

At step 210, the carrier substrate 102 is received with the recessed channels 105 formed in its top surface. The dashed vertical line dividing the carrier substrate 102 indicates a location at which the carrier substrate 102 may latter be diced into separate portions.

At step 220, sensor devices 120 (which may be mounted or otherwise formed on die 110) are coupled to the carrier substrate 102, adjacent to the recessed channels 105 formed on the top surface of the carrier substrate 102.

At step 230, a molding fixture 232 is positioned over the carrier substrate 102. The molding fixture 232 includes cavities that allow introduction of the elastomer material 130. precursor material to the elastomer material 130. The recessed channels 105 allow the elastomer material 130 to surround the sensor devices 120 and to fill the recessed channels 105, forming flanges adjacent to the sensor devices 120.

At step 240, the molding fixture 232 has been removed leaving the elastomer material 130 surrounding each sensor device 120 with the flanges formed in the recessed channels 105 of the carrier substrate 102. The carrier substrate has been diced to yield individual devices 100 that include a pair of sensor devices 120, as shown in FIG. 1. The cover 150 is positioned over the sensor devices 120, and the cover 150 is bonded to the elastomer material 130 within the recessed channels 105 as shown in FIG. 1. In one or more embodiments, as shown, and adhesive material is applied to the portions of the cover 150 that will contact the elastomer material 130 in the recessed channels 105. It will be appreciated that in one or more embodiments, an adhesive such as the adhesive material 152 is applied directly to the elastomer material 130 rather than to the cover 150. In still other embodiments, the cover 150 is bonded directly to the elastomer material 130 via a thermal bonding process or another other suitable process.

Figure 3:
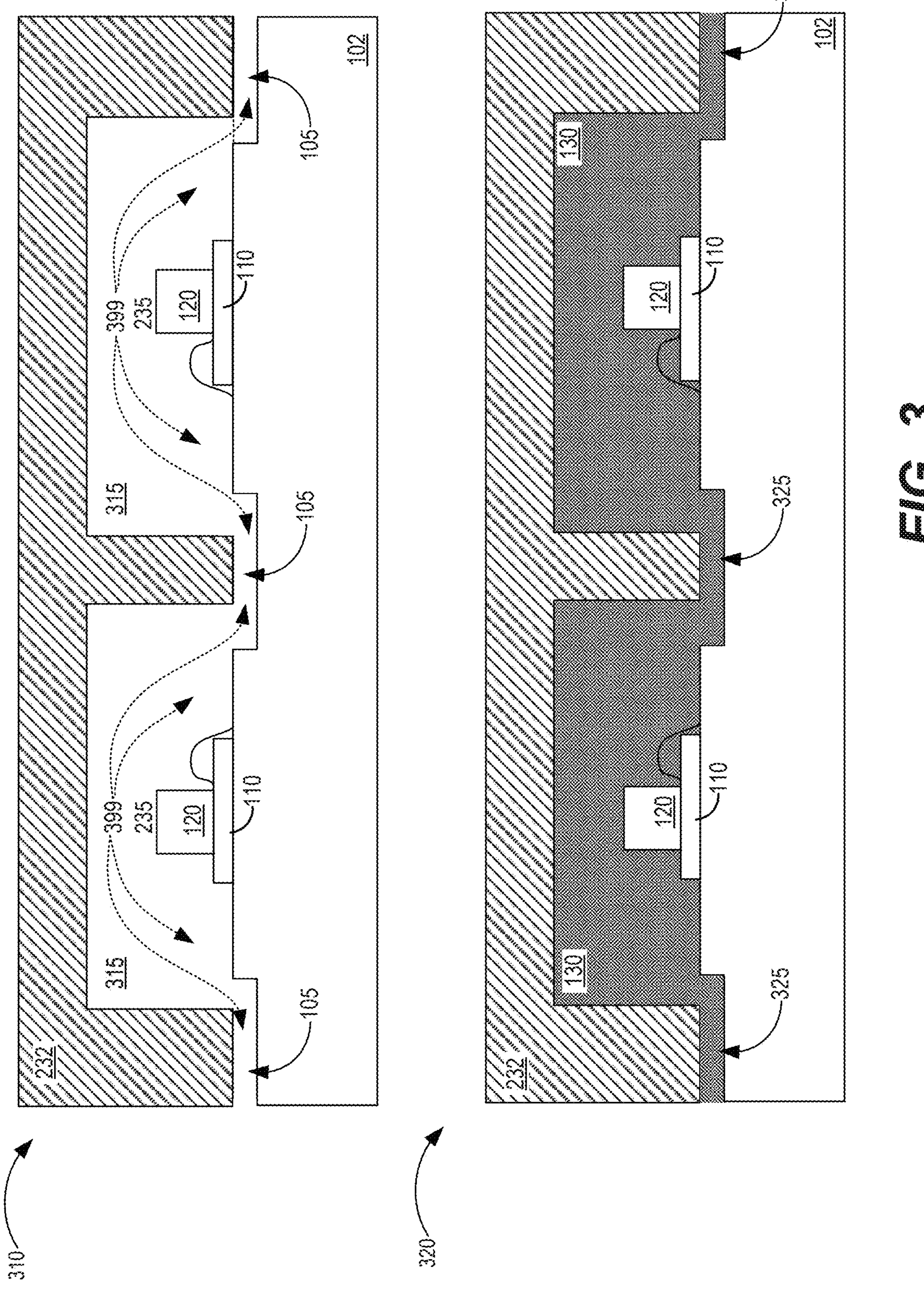
FIG. 3 shows cross-sectional views of the device of FIG. 1 that illustrates features of the process of FIG. 2 in greater detail.

FIG. 3 shows cross-sectional views illustrating features of a process such as the process 200 in greater detail described in connection with forming the device 100 using the process 200. The relative dimensions of various structures have been modified for greater clarity. In the cross-section 310, the molding fixture 232 is positioned over the carrier substrate 102. It will be understood that, although the molding fixture 232 appears to be suspended above the carrier substrate 102, it may instead contact the substrate 102 at locations that are not visible in the cross-section depicted. The protrusions in the molding fixture that form the cavities 235 above the sensor devices 120 are positioned such that the recessed channels 105 remain at least partially open to the cavities 235. As a result, when a material such as the elastomer material 130 (or a precursor material to the elastomer material 130) is introduced into the cavities (e.g., via apertures in the molding fixture which are not shown), the material can flow into the recessed channels 105 as indicated schematically by the dashed arrows, forming the flanged areas 325 in the elastomer material 130, as shown in the cross-section 320.

EXAMPLES

Features of embodiments may be understood by way of one or more of the following examples:

Example 1: A method or device that includes a first sensor device on a top surface of carrier substrate encapsulated within a volume of elastomer material and a cover bonded to a flanged area formed by the volume of elastomer material. The first sensor device is adjacent to a first recessed channel in the carrier substrate. The volume of elastomer material has a first height above the carrier substrate in a first region above the first sensor device. The flanged area is formed by a portion of the elastomer material that fills the first recessed channel and is recessed below the first height in a second region adjacent to the first region. The cover is bonded to the flanged area in the second region that overlies the volume of elastomer material such that the cover is separated from the volume of elastomer material by a gap within the first region.

Example 2: The device or method of Example 1 that further includes an adhesive material disposed on the flanged area bonding the cover to the top surface of the flange.

Example 3: The device or method of Example 1 or 2, that includes adhesive material disposed on a portion of a bottom surface of the cover corresponding to the that bonds the cover to the top surface of the flanged area via the adhesive material disposed on said portion of the bottom surface of the cover.

Example 4: The device or method of any of Examples 1-3, in which the first sensor device is a pressure sensor having a predetermined pressure range of operation and the elastomer material is configured to deform in response to ambient pressures within the range of operation of the pressure sensor.

Example 5: The device or method of Example 4, where the gap between the cover and the elastomer material is dimensioned such that the cover and the elastomer material remain separated by the gap over the pressure range of operation of the pressure sensor.

Example 6: The device or method of any of Examples 1-5, where the cover includes a fluid port having an opening above a pressure sensor through which the elastomer material above the pressure sensor is exposed.

Example 7: The device or method of any of Examples 1-6, where the cover has an elastic modulus that is larger than an elastic modulus of the elastomer material.

Example 8: The device or method of any of Examples 1-7, that also includes a second sensor device disposed on the top surface of the carrier substrate and encapsulated within the volume of elastomer material. The second sensor device is adjacent to a second recessed channel in the carrier substrate that is disposed between the first sensor device and the second sensor device. The volume of elastomer material has the first height above the carrier substrate in a third region above the second sensor device. A portion of the volume of elastomer material fills the second recessed channel and forms a second flanged area that is recessed below the first height between the first sensor device and the second sensor device.

Example 9: The device or method of any of Examples 1-8, that includes comprises bonding the cover to a top surface of the second flanged area.

Example 10: The device or method of any of Examples 1-9, in which the carrier substrate is substrate is diced along a line that passes through the second recessed channel to produce a first component that includes the first sensor device and a second component that includes the second sensor device.

Example 11: The device or method of any of Examples 1-10 in which a gap between the cover and the elastomer material is dimensioned such that the cover and the elastomer material remain separated by the gap over a predetermining pressure range of operation of the first sensor device.

The preceding detailed description and examples are merely illustrative in nature and are not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, or detailed description.

It should be understood that this invention is not limited in its application to the details of construction and the arrangement of components set forth in the preceding description or illustrated in the accompanying drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The preceding discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The preceding detailed description is to be read with reference to the figures, in which like elements in different figures have like reference numerals. The Figures, which are not necessarily to scale, depict selected embodiments and are not intended to limit the scope of embodiments of the invention. Skilled artisans will recognize the examples provided herein have many useful alternatives and fall within the scope of embodiments of the invention.

Connecting lines shown in the various figures contained herein are intended to represent exemplary functional relationships and/or physical couplings between the various elements. It should be noted that many alternative or additional functional relationships or physical connections may be present in one or more embodiments of the subject matter. In addition, certain terminology may also be used herein for the purpose of reference only, and thus are not intended to be limiting, and the terms "first," "second" and other such numerical terms referring to structures do not imply a sequence or order unless clearly indicated by the context.

The foregoing description refers to elements or nodes or features being "connected" or "coupled" together. As used herein, unless expressly stated otherwise, "connected" means that one element is directly joined to (or directly communicates with) another element, and not necessarily mechanically. Likewise, unless expressly stated otherwise, "coupled" means that one element is directly or indirectly joined to (or directly or indirectly communicates with, electrically or otherwise) another element, and not necessarily mechanically. Thus, although the schematic shown in the figures depict one exemplary arrangement of elements, additional intervening elements, devices, features, or components may be present in one or more embodiments of the depicted subject matter.

What is claimed is:

1. A method comprising:

encapsulating a first sensor device on a top surface of carrier substrate within a volume of elastomer material, wherein the first sensor device is adjacent to a first recessed channel in the carrier substrate;

wherein the volume of elastomer material has a first height above the carrier substrate in a first region above the first sensor device;

wherein a portion of the volume of elastomer material fills the first recessed channel and forms a first flanged area that is recessed below the first height in a second region adjacent to the first region; and wherein the method further comprises bonding a cover to the first flanged area in the second region that overlies the volume of elastomer material such that the cover is separated from the volume of elastomer material by a gap within the first region.

2. The method of claim 1, further comprising disposing adhesive material on the first flanged area and bonding the cover to the top surface of the first flanged area via the adhesive material disposed on the flange.

3. The method of claim 1, further comprising disposing adhesive material on a portion of a bottom surface of the cover corresponding to the first flanged area and bonding the cover to the top surface of the first flanged area via the adhesive material disposed on said portion of the bottom surface of the cover.

4. The method of claim 1, wherein the first sensor device is a pressure sensor having a predetermined pressure range of operation and wherein the elastomer material is configured to deform in response to ambient pressures within the range of operation of the pressure sensor.

5. The method of claim 4 wherein the gap between the cover and the elastomer material is dimensioned such that the cover and the elastomer material remain separated by the gap over the pressure range of operation of the pressure sensor.

6. The method of claim 4, wherein the cover includes a port having an opening above the pressure sensor through which the elastomer material above the pressure sensor is exposed.

7. The method of claim 4, wherein the elastomer material has an elastic modulus that is larger than an elastic modulus of the elastomer material.

8. The method of claim 1, further comprising:

encapsulating a second sensor device on the carrier substrate within the volume of elastomer material, wherein the second sensor device is adjacent to a second recessed channel in the carrier substrate that is disposed between the first sensor device and the second sensor device;

wherein the volume of elastomer material has the first height above the carrier substrate in a third region above the second sensor device; and wherein the volume of elastomer material fills the second recessed channel and forms a second flanged area that is recessed below the first height between the first sensor device and the second sensor device.

9. The method of claim 8, wherein the method further comprises bonding the cover to a top surface of the second flanged area.

10. The method of claim 8, further comprising:

dicing the carrier substrate along a line that passes through the second recessed channel to produce a first component that includes the first sensor device and a second component that includes the second sensor device.

11. The method of claim 1, wherein the top surface of the carrier substrate in the first region extends to a second height above a bottom of the first recessed channel; and wherein the first flanged area extends to the second height above the bottom of the first recessed channel.

12. A device comprising:

a first sensor device disposed on a top surface of carrier substrate adjacent to first recessed channel in the carrier substrate;

a volume of elastomer material disposed on the carrier substrate that encapsulates the first sensor device; and a cover disposed above the volume of elastomer material;

wherein the volume of elastomer material has a first height above the carrier substrate in a first region above the first sensor device;

wherein a portion of the volume of elastomer material fills the first recessed channel to form a first flanged area that is recessed below the first height in a second region adjacent to the first region; and wherein the cover is bonded to the first flanged area in the second region that overlies the volume of elastomer material such that the cover is separated from the volume of elastomer material by a gap within the first region.

13. The device of claim 12, wherein the cover is bonded to the first flanged area via an adhesive material disposed between a bottom surface of the cover and the top surface of the first flanged area.

14. The device of claim 12, wherein the first sensor device is a pressure sensor having a predetermined range of operation and wherein the elastomer material is configured to deform in response to ambient pressures within the range of operation of the pressure sensor.

15. The device of claim 14 wherein the gap between the cover and the elastomer material is dimensioned such that the cover and the elastomer material remain separated by the gap over the range of operation of the pressure sensor.

16. The device of claim 14, wherein the cover includes a fluid port having an opening above the pressure sensor through which the elastomer material above the pressure sensor is exposed.

17. The device of claim 14, wherein the cover has an elastic modulus that is larger than an elastic modulus of the elastomer material.

18. The device of claim 17 wherein the elastic modulus of the cover is at least one-thousand times larger than the elastic modulus of the elastomer material.

19. The device of claim 12, further comprising:

a second sensor device disposed on the top surface of the carrier substrate and encapsulated within the volume of elastomer material, wherein the second sensor device is adjacent to a second recessed channel in the carrier substrate that is disposed between the first sensor device and the second sensor device;

wherein the volume of elastomer material has the first height above the carrier substrate in a third region above the second sensor device; and wherein the volume of elastomer material fills the second recessed channel and forms a second flanged area that is recessed below the first height between the first sensor device and the second sensor device.

20. The device of claim 12, wherein the top surface of the carrier substrate in the first region extends to a second height above a bottom of the first recessed channel; and wherein the first flanged area extends to the second height above the bottom of the first recessed channel.

* * * * *